Jan. 27, 1959

J. K. BRIXIUS ET AL 2,870,864

AUTOMATIC SELF-CLEANING FILTER

Filed Nov. 12, 1953

INVENTOR.
JACOB K. BRIXIUS
GEORGE M. WALTON
BY

ATTORNEYS

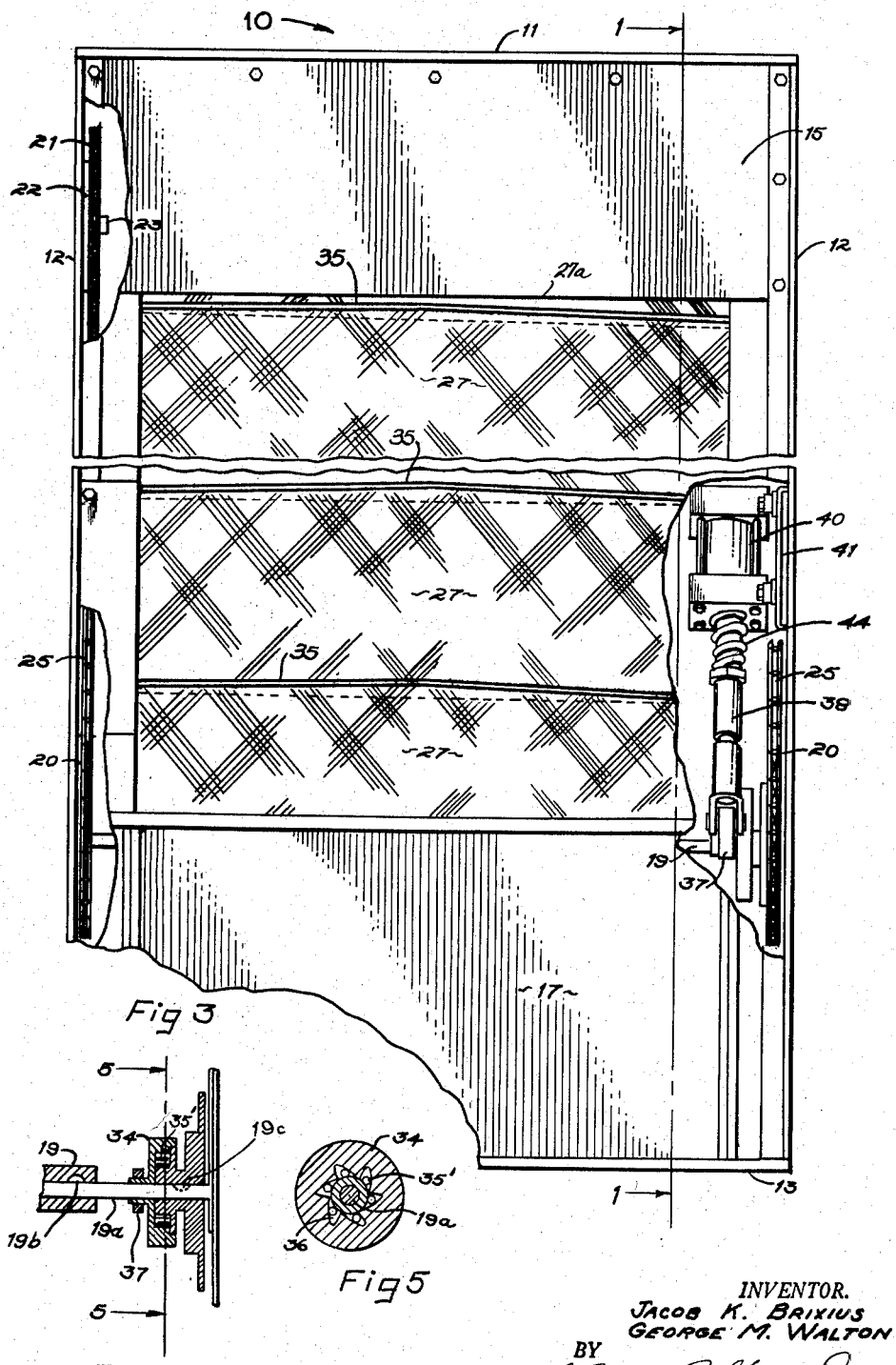

Jan. 27, 1959　　　J. K. BRIXIUS ET AL　　　2,870,864
AUTOMATIC SELF-CLEANING FILTER
Filed Nov. 12, 1953　　　　　　　　　　　　3 Sheets-Sheet 3

INVENTOR.
JACOB K. BRIXIUS
GEORGE M. WALTON
BY
Hyde, Meyer, Baldwin & Doran
ATTORNEYS

United States Patent Office 2,870,864
Patented Jan. 27, 1959

2,870,864

AUTOMATIC SELF-CLEANING FILTER

Jacob K. Brixius, Cleveland, and George M. Walton, Shaker Heights, Ohio, assignors to Air-Maze Corporation, Cleveland, Ohio, a corporation of Delaware Application November 12, 1953, Serial No. 391,539

6 Claims. (Cl. 183—52)

This invention relates to automatic air filters and more particularly to self-cleaning air filters of curtain type.

An object of the invention is to provide an air filter wherein the filter cells are periodically immersed in a liquid reservoir for cleaning and coating purposes.

Another object of the invention is to provide a self-cleaning action for the filter elements while they are immersed in a liquid reservoir.

A further object is to provide a stroke impulse drive means, whereby said filter cells are propelled through a fluid in a reservoir with such sudden force as to effectively remove materials accumulated thereon.

A still further object is to intermittently subject the filter cells during submergence in a liquid reservoir, to a sudden impulse force which will cause the filter cells to travel a short distance almost instantaneously, and then oscillate for a period of time after the filter has stopped its forward movement.

Another object is to provide a novel seal between adjacent filters in a generally vertical curtain, one that will prevent passage of air other than through the filter media and also serve to drain excessive liquid from each filter cell to the reservoir without having the liquid run over each lower positioned filter cell.

Another object of the present invention is to provide an automatic self-cleaning filter characterized by its structural simplicity, the ease of assembly of its parts, its strong and sturdy nature and its low manufacturing costs. Other features of this invention reside in the arrangement of the parts for carrying out their appropriate functions.

Other objects and advantages of this invention will be apparent from the accompanying drawings and description and the essential features will be set forth in the appended claims.

In the drawings,

Fig. 3 is a front elevational view of the air filter taken from the right-hand side of Fig. 1, with parts broken away to more clearly show the driving mechanism employing an overrunning clutch in place of the pawl and ratchet of Fig. 2.

Fig. 4 is a fragmental sectional view taken along the line 4—4 of Fig. 1 showing the overrunning clutch type drive and its connection with the drive shaft.

Fig. 5 is a sectional view of the overrunning clutch housing and drive shaft taken along line 5—5 of Fig. 4.

Figures 1, 2:
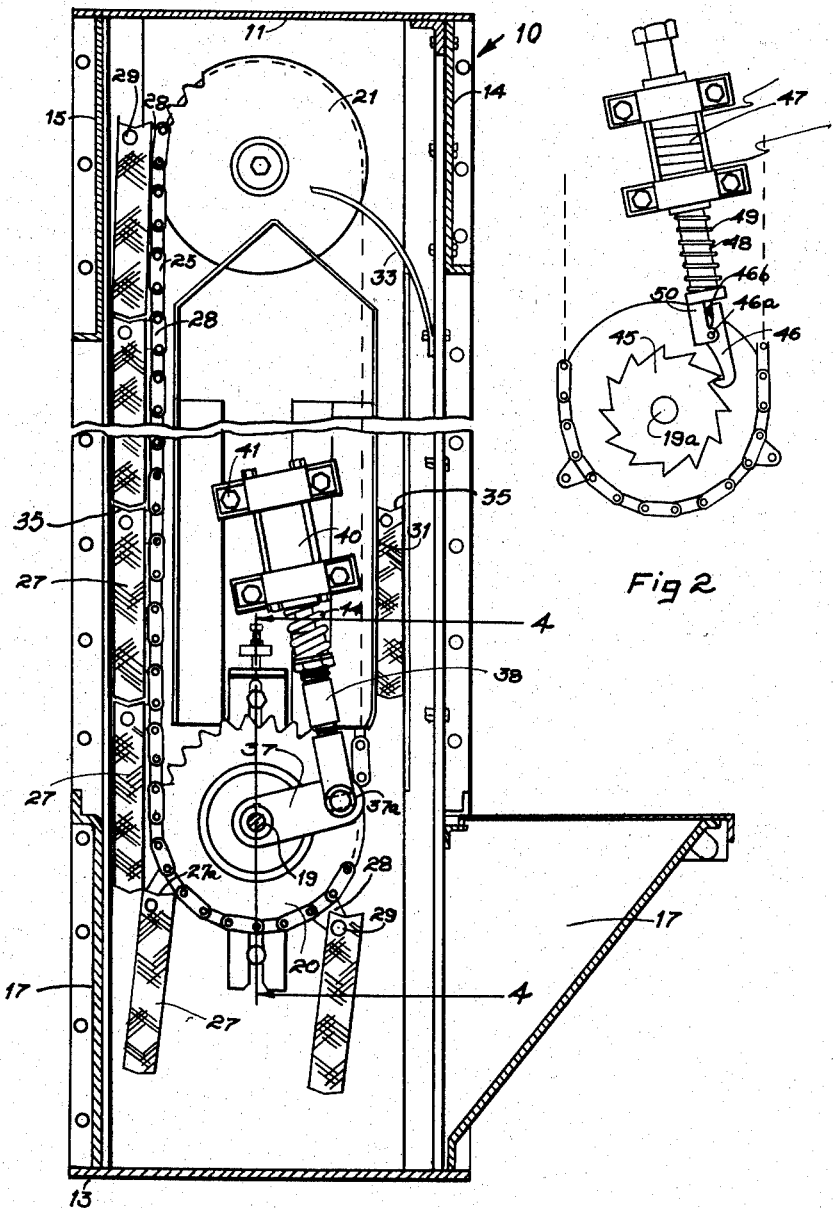
Fig. 1 is a vertical sectional view of my automatic air filter taken along line 1—1 of Fig. 3 and showing a solenoid type drive.
Fig. 2 is an enlarged view of the solenoid drive mechanism of Fig. 1 embodying the use of a pawl and ratchet for driving the filter cells.

Referring now to Figs. 1 and 3, there is shown an automatic filter 10 for air or other gaseous stream, said filter having a box-type framework which comprises a top 11, parallel side walls 12 and a bottom 13. Suitable structural frame pieces such as channels or angles support these walls. Front and back panels 14 and 15 respectively at the top are spaced from a liquid reservoir 17 at the bottom of the filter to provide stream inlet and outlet openings at the front and back respectively. The reservoir also aids in supporting the side walls of the frame.

A driving shaft 19 extends transversely across the filter approximately level with the top of the reservoir 17. The ends of the shaft are carried by the side walls 12 of the filter frame. Mounted on shaft 19 and positioned at each end thereof is a sprocket wheel 20. At the upper end of the filter frame in vertical alignment with the lower sprocket wheels 20 are two spaced guide sprocket wheels 21 of approximately the same diameter as the lower wheels. The upper wheels are mounted on the side walls 12 for free rotation by means of a bracket 22 and axle 23. An endless carrying chain 25 passes about each pair of alined upper and lower sprocket wheels. A series of filter cells 27 are pivotally suspended between links of the chains, each filter cell being suspended at a point above its center of gravity. This pivotal connection is accomplished by providing the chain link with a bracket 28 having an aperture to pivotally receive a pivot stud 29 rigidly attached to each end of the filter cell. The brackets are positioned to pivotally suspend the filter cells so that the upper and lower edges of adjacent cells lie in close relation with each other. The filter cells attached to the chain in this manner form a rotary belt or curtain which is placed perpendicular with respect to the current of air and in such a way that the two halves of the belt or curtain will be one behind the other so as to be successively traversed by the air current. On the intake side of the filter, which is at the right as viewed in Fig. 1, the cells move upwardly after being cleaned in the liquid reservoir 17. This side forms the front or inlet curtain of the filter. The air outlet side of the filter moves downwardly and forms the second curtain through which the air passes after passing through the cells in the first mentioned filter curtain. Thus, it can be seen that the filter elements have two runs wherein they rise and descend respectively.

A guide member 31 is fastened to each of the side walls 12 and is so constructed that a portion thereof lies in spaced relation to the side wall and forces all panels 27 against the front face of the frame on the upward run of the trajectory. The filter cells forming the front curtain of the filter have the side edges of their back surfaces abut the vertical guide 31. This construction insures a vertical front curtain at all times; one which cannot be deflected by strong incoming air currents. With a front curtain maintained in a vertical position at all times there can be no passage of air other than through the filter media. This vertical position is maintained even when the filtering element passes from the rectilinear part of the circuit to a curved portion or vice versa. However, to accommodate the filter around the upper curved portions, the guide member 31 slopes inwardly to a point. This slope supplies a support for the bottom of each filter as it changes from rectilinear movement to curvilinear movement around the sprocket wheels 21. A spring 33 is fastened to the filter frame member 12 and abuts the side of each cell as it shifts from a straight to a curved line motion and makes certain that the bottom of the cell contacts the guide 31 and will clear the apex of the guide 31. The spring and guide further restrain the filter plates from oscillating during their passage around the curved end of the trajectory. In order to accommodate the shift from motion in a straight line to motion on a curved line, it becomes necessary to separate the successive cells by an intermediate space. In providing enough space for free movement between adjacent cells and still preventing the passage of air which has not been purified the entire upper edge of each filter cell is provided with a channel or groove 35 which slopes downwardly from an intermediate point of the groove and outwardly to the side edges of the filter cell in a plane at right angles to the general direction of stream travel through said curtain of filter cells, as seen in Figs. 1 and 3. The bottom edge of each filter cell is shaped to conform to the channel 35 so as to be loosely received within said channel. This type of construction serves the further purpose of catching the excess oil from the filter cell immediately above it and carrying it to the side edges of the filter and thereby return it to the reservoir near side walls 12. This construction further prevents the excessive oil on each filter from running over the filtering area of all of the filters located below it, before reaching the reservoir.

The shaft 19 intermittently drives the lower sprocket wheels 20 which in turn drive the carrier chains 25 and the filter cells carried thereby. One manner of driving the shaft 19 is by means of an overrunning clutch, as best seen in Figs. 4 and 5, said clutch having a housing 34 and a plurality of roller bearings 35' contained in the housing which rotate freely about the hub extension 20a of sprocket wheel 20 when the clutch turns in a clockwise direction as viewed in Fig. 5. Bearings 35' become jammed between slots 36 of housing 34 and the driven member on hub 20a when rotated counterclockwise. The hub extension 20a is secured to the shaft 19a by means of key 19c. For purposes of assembly, the clutch is connected to a shaft 19a shown in Fig. 4 which in turn is keyed at 19b to the main drive shaft 19. The clutch is driven through a connecting lever arm 37 which has one end securely fastened to the clutch housing 34. The other end of the lever arm has a slot 37a which pivotally receives drive rod 38 which is connected directly to an electromagnetic solenoid 40. The slot 37a permits arcuate movement in lever arm 37 while drive rod 38 travels in a straight line. The solenoid is fastened to a bracket 41 which is bolted to the filter side wall 12. The solenoid is energized during predetermined periods of time through suitable timing mechanism, as indicated at 43, in Fig. 7. During such periods of time as the solenoid is energized it imparts an instantaneous impulse movement to the shaft 19, which imparts a very quick jerky movement to the chain 25 carrying the filter cells. The filter cells are thereby given an extremely rapid jerky movement of short stroke at intermittent periods of time.

When the solenoid 40 becomes energized, it causes the drive rod 38, as viewed in Fig. 1, to move upwardly causing housing 34 to move counterclockwise, as viewed in Fig. 5, in a clutch engaging manner, and thereby causes the string of filter cells to rotate in a counterclockwise movement. Such movement places spring 44 in compression, and immediately upon de-energization of the solenoid, spring 44 returns driving rod 38 to its normal position with a free rotational clutch movement about shaft 19a, clockwise as viewed in Fig. 5.

In place of the overrunning clutch, as heretofore described, a ratchet and pawl drive may be substituted as shown in Fig. 2. Here all drive parts are similar to those shown in Fig. 1, except a ratchet gear 45 fastened to shaft 19a has been substituted for the overrunning clutch and a pawl 46 for the lever 37 of Fig. 1. Upon energization, the solenoid 47 causes the driving rod 48 to be drawn upward as viewed in Fig. 1. The pawl 46 engages the teeth of ratchet gear 45 and rotates the shaft 19a. The spring 49 becomes compressed and upon de-energization of the solenoid returns the pawl to its initial position without rotating the shaft 19a. The pawl 46 is pivoted intermediate its end portions about pin 46a which is held between bifurcated bracket 50 forming an extension on drive rod 48.

A spring 46b provides enough resiliency in pawl 46 for clearing the teeth of ratchet gear 45 during the pawl's return to its initial drive position.

Figure 6:
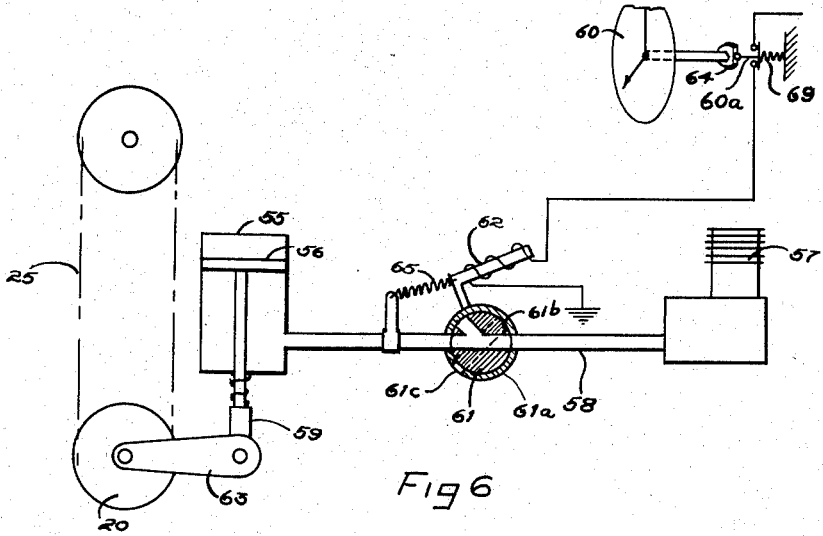
Fig. 6 is a diagrammatic view of an air pressure or hydraulic impulse driving system for intermittently actuating the air filter.
Figure 7:
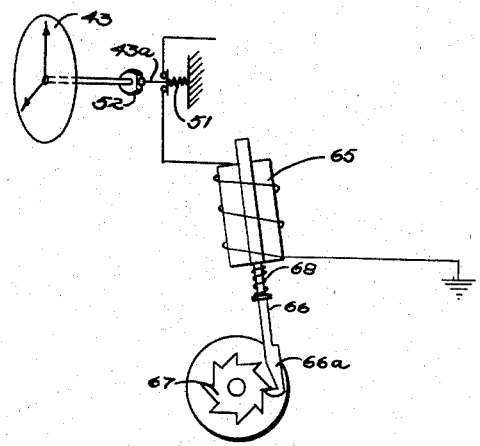
Fig. 7 is a diagrammatic view of an electrical solenoid impulse drive system for intermittently driving the air filter.

Figs. 6 and 7 diagrammatically show two forms of driving means for actuating the filter cell. Fig. 6 shows a cylinder 55 and a piston 56 and rod 59 for driving the carrier chain 25. Here a compressor 57 forces a fluid under pressure through line 58 into the cylinder 55, causing the piston to be forced upwardly and thereby driving the carrier chain through the drive rod 59, lever arm 63 and sprocket wheel 20. The drive is controlled by suitable timing means 60 which controls a two-position valve actuated by solenoid 62. the timer 60 opens and closes a circuit by means of switch 60a which energizes the solenoid 62 in turn rotating valve 61.

Switch 60a is urged into a circuit closing position, as shown in Fig. 6, by compression spring 69. Only during the period when the stem of switch 61a rides over the flat portion of cam 64 does the switch actually close the circuit. When the circuit is closed, the valve 61 moves to the full line position wherein the cylindrical opening 61a is aligned with the opening of pipe 58 so as to allow free fluid passage between the compressor 57 and cylinder 55. When the timer opens the switch 60a, the solenoid 62 is de-energized and valve 61 is rotated to the dotted-line position 61b by spring 65 which becomes tensioned during the opening movement. The passage between compressor 57 and cylinder 55 is thereby closed. The fluid which has been compressed in cylinder 55 now escapes through bleeder opening 61c in valve 61.

Fig. 7 diagrammatically illustrates a solenoid drive mechanism as previously explained, wherein timer 43 opens and closes a circuit by means of switch 43a which controls the energization of solenoid 65. When the flat portion of cam 52 is exposed to switch 43a, compression spring 51 urges the switch into a circuit closing position in the same manner as previously described. Upon energizing the solenoid the drive rod 66 is drawn upward and causes the pawl 66a to drive ratchet gear 67. When the switch 43a is opened solenoid 65 is de-energized, and compression spring 58 forces the pawl to return to its initial position without rotating the ratchet gear 67. Of course, it should be understood that the overrunning clutch or ratchet drive may be freely interchanged on the various types of actuating means described above.

The operation of the filter should now be apparent. The filter cells 27 are suspended from carrier chains 25 and move up the front of the filter to thereby form a curtain on the dirty air intake side of the filter. The cells then move across the top and down the back or clean air outlet side of the filter until they finally become submerged in the cleaning reservoir at the bottom of the frame before proceeding on to the upward movement along the front of the filter. The reservoir 17 is filled with a liquid to completely submerge the filter cells. This liquid is usually an oil of the type used for coating impingement type filters. The carrier chain from which the cells are suspended is intermittently actuated by the solenoid or fluid drive means. The intermittent drive is controlled by an adjustable automatic time control which can be adjusted so that the filter will make as many revolutions in a definite period of time as desired. This adjustment for normal use will be approximately one complete revolution of the filter in a 24 to 36 hour period. However, this can be changed to accommodate the particular dust load encountered.

Each intermittent movement of the filter curtain exposes a portion of a filter which has just been cleaned and oiled in the reservoir; and at the same time immersing dirty curtain portions for cleaning.

The novel cleaning action, which takes place while the filter cells are immersed in the cleaning reservoir will now be described. As the filter cells descend and become immersed in the reservoir, the surface tension of the oil film on the filters is released to a degree and allows a portion of the dust to settle out by gravity. However, this action alone is not sufficient to clean the cells. Therefore, we subject the filter cells to a jerky driving impulse which drives the filter a short distance (usually about one inch) through the liquid in the reservoir, at an extremely high speed. This sudden, short movement through the liquid in reservoir 17 dislodges and washes away dirt from the filter media. This type of impulse drive is best attained through the use of an electromagnetic solenoid or movable abutment and fluid pressure drive means, both of which will operate substantially instantaneously through such a short distance. The short jerky drive causes the filter to oscillate about pivot pin 29 when hanging in approximately a vertical position as they pass about the curved end portions of the filter trajectory. There being no need for such oscillation at the upper end, guide members 31 and spring 33 are provided to prevent oscillation at that point, as previously described.

The initial impulse drive causes the liquid in the reservoir to be thrust through the filter cell media with great force and thereby flush away the accumulated dust particles. The subsequent oscillation aids in dislodging any remaining dirt. The fact that the filter is actuated intermittently also aids in the cleaning process since it gives the filter a chance to soak and breaks the surface tension of the liquid which holds the dust to the filter media.

In each embodiment shown and described, it requires a plurality of the jerky impulses to move a filter cell through the cleaning bath. This remark applies to Fig. 1 solenoid 40 and drive rod 38; Fig. 2 solenoid 47 and drive rod 48; Fig. 6 cylinder and piston motor 55, 56 and drive rod 59; and Fig. 7 solenoid 65 and drive rod 66.

In view of the foregoing description, taken in conjunction with the accompanying drawings, it is believed that a clear understanding of the construction, operation, and advantages of the device will be quite apparent to those skilled in this art.

It is to be understood, however, that even though there is herein shown a preferred embodiment of the invention, the same is susceptible to certain changes fully comprehended by the spirit of the invention.

What we claim is:

1. In an automatic filter comprising a supporting frame, spaced upper and lower guide means, a pair of generally parallel endless flexible carrying means passing around said upper and lower guide means, and having two generally vertical runs spaced apart in the direction of stream flow through the filter, a plurality of filter cells mounted on said carrying means and forming a substantially endless curtain on both of said vertical runs, a liquid reservoir in the bottom of said frame at a level to substantially submerge said filter cells as they pass around said lower guide means; the combination therewith of stroke impulse driving means operatively connected with said flexible carrying means, said driving means including power means providing at each energization thereof a jerky driving impulse to said carrying means sufficient to propel a filter cell in said reservoir to cause a cleansing action of said liquid so as to free material caught on said filter cells, one energization of said power means being insufficient to propel a filter cell through the liquid in said reservoir.

2. In an automatic filter comprising a supporting frame, spaced upper and lower guide means, a pair of generally parallel endless flexible carrying means passing around said upper and lower guide means, and having two generally vertical runs spaced apart in the direction of stream flow through the filter, a plurality of filter cells mounted on said carrying means and forming a substantially endless curtain on both of said vertical runs, a liquid reservoir in the bottom of said frame at a level to substantially submerge said filter cells as they pass around said lower guide means; the combination therewith of stroke movable abutment and pressure fluid drive means operatively connected with said abutment, said driving means including power means providing at each energization thereof a jerky driving impulse sufficient to propel a filter in said reservoir to cause a cleansing action of said liquid on material caught on said filter cells, one energization of said power means being insufficient to propel a filter cell through the liquid in said reservoir.

3. In an automatic filter comprising a supporting frame, spaced upper and lower guide means, a pair of generally parallel endless flexible carrying means passing around said upper and lower guide means, and having two generally vertical runs spaced apart in the direction of stream flow through the filter, a plurality of filter cells mounted on said carrying means and forming a substantially endless curtain on both of said vertical runs, a liquid reservoir in the bottom of said frame at a level to substantially submerge said filter cells as they pass around said lower guide means; the combination therewith of stroke impulse driving means for intermittently driving said flexible carrying means, said driving means including power means providing at each energization thereof a short jerky driving impulse sufficient to advance a filter cell in the reservoir causing the liquid to surge through the filter cell and effectively remove accumulated material on said filter cells, a channel formed in the upper edge of each of said filter cells, said channel sloping from an intermediate point outwardly in opposite directions toward the side edges of said filter cells in a plane at right angles to the general direction of stream travel through said curtain, the lower edge of each filter cell being complementary to the upper edge of the adjacent cell and engaging the same in sealing relationship, one energization of said power means being insufficient to propel a filter cell through the liquid in said reservoir.

4. In a filter comprising a supporting frame, a pair of spaced driving wheels connected by a transverse axle, a pair of spaced guide wheels, a pair of endless rotatable carrying means extending about said wheels at each side of said frame, a plurality of filter cells pivotally suspended between said carrying means, said cells suspended above the center of gravity to normally hang in a vertical position in edge to edge abutment, a liquid reservoir located at the bottom of said frame at a level to substantially submerge said filter cells as they pass around the lower portion of said carrying means; the combination therewith of rapid stroke impulse driving means operatively connected with said carrying means, said driving means including power means providing at each energization thereof an intermittent jerky driving impulse sufficient to travel a filter cell in the liquid of said reservoir causing said liquid to surge through the filter with a cleansing action, one energization of said power means being insufficient to propel a filter cell through the liquid in said reservoir, a groove formed in the upper edge of said filter cells, said grooves sloping from an intermediate point outwardly toward the side edges of each filter cell, the lower edge of said filter cells engaging the grooves of the adjacent cells in sealing relationship, and spring means on said frame engaging each filter cell for smooth vertical passage about the upper portion of said carrier.

5. In an automatic filter comprising a supporting frame, spaced upper and lower guide means, a pair of generally parallel endless flexible carrying means passing around said upper and lower guide means, and having two generally vertical runs spaced apart in the direction of stream flow through the filter, a plurality of filter cells mounted on said carrying means and forming a substantially endless curtain on both of said vertical runs, a liquid reservoir in the bottom of said frame at a level to substantially submerge said filter cells as they pass around said lower guide means, driving means for driving said flexible carrying means; the combination therewith of a channel formed in the upper edge of each of said filter cells, said channel sloping from an intermediate point outwardly in opposite directions toward the side edges of said filter cells in a plane at right angles to the general direction of stream travel through said curtain, the lower edge of each filter cell being complementary to the upper edge of the adjacent cell and engaging the same in sealing relationship.

6. The combination of claim 1 wherein said driving means is an electrically actuated solenoid.

References Cited in the file of this patent

UNITED STATES PATENTS

| | | |
|---|---|---|
| 1,788,164 | Lederer | Jan. 6, 1931 |
| 1,941,524 | Wittemeier et al. | Jan. 2, 1934 |
| 2,511,295 | Roop | June 13, 1950 |
| 2,516,680 | Culpepper | July 25, 1950 |
| 2,586,616 | Dahlman | Feb. 19, 1952 |

FOREIGN PATENTS

| | | |
|---|---|---|
| 565,067 | Great Britain | Oct. 25, 1944 |
| 133,753 | Australia | Aug. 3, 1949 |